United States Patent [19]
Rathsack

[11] Patent Number: 6,159,575
[45] Date of Patent: Dec. 12, 2000

[54] HEIGHT-COMPENSATING CONSTRUCTION SHIM

[76] Inventor: Wolfgang Rathsack, Seestrasse 1, D-17213, Strietfeld, Germany

[21] Appl. No.: 09/155,822

[22] PCT Filed: Feb. 2, 1998

[86] PCT No.: PCT/DE98/00388

§ 371 Date: Nov. 5, 1998

§ 102(e) Date: Nov. 5, 1998

[87] PCT Pub. No.: WO98/35164

PCT Pub. Date: Aug. 13, 1998

[30] Foreign Application Priority Data

Feb. 5, 1997 [DE] Germany ............................ 297 02 718

[51] Int. Cl.[7] .............................. F16B 43/00; B32B 3/06
[52] U.S. Cl. ............................... 428/80; 428/81; 428/99; 428/119; 428/156; 428/157; 428/167; 52/126.1
[58] Field of Search ................................ 428/80, 99, 157, 428/156, 167, 119, 81; 384/626; 52/126.1

[56] References Cited

U.S. PATENT DOCUMENTS 4,908,245   3/1990   Shah et al. ................................ 428/33

FOREIGN PATENT DOCUMENTS

| | | |
|---|---|---|
| 0 127 021 A2 | 12/1984 | European Pat. Off. . |
| 0 171 545 A1 | 2/1986 | European Pat. Off. . |
| 0 719 953 A2 | 7/1996 | European Pat. Off. . |
| 2 607 548 | 6/1988 | France . |
| 2 643 104 A1 | 8/1990 | France . |
| 79 21 065 | 11/1979 | Germany . |
| 93 04 706 | 9/1994 | Germany . |
| 2 255 999 | 11/1992 | United Kingdom . |

Primary Examiner—Alexander S. Thomas
Attorney, Agent, or Firm—Herbert Dubno; Andrew Wilford

[57] ABSTRACT

A height-compensating construction shim has a one-piece plate having opposite parallel upper and lower faces and is formed with a wedge-shaped end having angled surfaces, a longitudinal slot subdividing the plate at the end into a pair of longitudinally extending arms, and rows of transverse elastic retaining tabs projecting toward each other in the slot from inner edges of the arms. An outwardly open bevel is formed on each arm inner edge at an outer end of each arm and longitudinal guide ridges are provided on the angled web surfaces. Interfitting and complementary longitudinally extending guide formations on the upper and lower faces are constructed such that the guide formations of an upper face of one such shim can fit with and slide in the guide formations of a lower face of another such shim. Outwardly open recesses in the upper and lower faces are each formed with a longitudinally extending web.

16 Claims, 5 Drawing Sheets

HEIGHT-COMPENSATING CONSTRUCTION SHIM

CROSS REFERENCE TO RELATED APPLICATIONS

This application is the U.S. national phase of PCT application PCT/DE98/00388 filed Feb. 2, 1998, now WO 98/35164 with a claim to the priority of German application 297 02 718.2 itself filed Feb. 5, 1997.

FIELD OF THE INVENTION

The invention relates to a height-compensating element, in particular for construction of wood, metal, or the like, comprising a flat plastic, wood, or metal plate with opposite parallel planar upper and lower faces and formed with one wedge-shaped end formed with an outwardly open insert slot forming a pair of arms themselves formed on the lower face with elastic retaining tabs that extend toward one another into the insert slot.

BACKGROUND OF THE INVENTION

EP 0,127,021 shows a spacer disk used for installing windows, interior construction, and roofing work which has a slot open at one side that extends from an open slot end to the center of the plate and that spacedly surrounds a mounting screw or the like with its slot end. The spacer disk is made of plastic and has at least one elastic holding tab that extends into the slot and is spaced for clamping freedom at a predetermined distance from the mounting screw.

A compensating plate for shimming laths is also known (German utility model 88 08 202.4) which consists of a plastic body with a front face and a back face and an opening for a mounting screw. The plastic body is circular, wedge-shaped, and formed with a slot. At least one face of the body is also provided with a profiling.

Compensating elements are further known from German G 87 01 267.7, U.S. Pat. Nos. 2,094,779, 4,892,435, or French 2,181,245 that are wedge-shaped and always used in pairs in order to make possible a parallel support of the roof sheathing on the roof joists.

According to EP 0,719,953 a device is known for compensating heights in construction elements which is formed as a wedge of plastic, wood, or the like. The wedge is made of a flat piece with parallel faces with one end. The piece is formed with a wedge-shaped end and a part of the flat section is formed with throughgoing slots.

In addition German G 83 22 420.3 describes a spacer element for use in securing construction elements such as lath supports, wall panels, furniture, or the like to support elements such as the room surfaces of a structure. It is formed of a small plate mounted between a support element and supported part and that is provided with a formation for the connection element. The known spacer element has on its upper surface connection elements such as mounting barbs or projections, for example bumps, points, and complementary recesses. These points or the projections on the support surfaces do indeed facilitate stacking of the spacer elements with considerable slip resistance between adjacent elements, but lead during driving in between laths and support beams or by subsequent positioning to their destruction or damaging. This spacer element is thus fully unsuitable for shimming of large height differences as appear between roof boards and roof beams.

All these solutions further share the disadvantage that the height-compensating elements break apart when being driven into the space to be filled, for instance between sheathing and roof beams, and in particular when the height-compensating elements are subsequently set they can slip as a result of loosening of the nails securing the roof boards to the beams. In addition there is the disadvantage that the known compensating elements are not combinable in different heights in order to compensate for different height differences. This leads again to considerable time and material expense, for example during roofing work.

OBJECTS OF THE INVENTION

In recognition of the disadvantages of this state of the art, it is an object of the invention to provide a height-compensating element of the above-described type that prevents a lateral breaking and sliding during driving in of the height-compensating element with simple use for different spaces to be filled.

SUMMARY OF THE INVENTION

This is achieved according to the invention with the compensating element of the above described type in that the arms defining the insert slot of the wedge-shaped end each have an inner edge formed with an outwardly directed bevel forming an insert aid, and that the upper face and lower face of the height-compensating element are formed with guide and retaining means that comprise interfitting guide formations such as ridges and grooves, and/or teeth and grooves, and that the arms and the plate are formed with recesses with stabilizing webs as well as at least two parallel ridges on the wedge face of the end to inhibit spreading during driving-in or setting.

In a preferred embodiment of the invention the pairs of formations on and in the upper face as well as on and in the lower face can be exchanged with each other.

It is further possible according to the invention for the upper face of the height-compensating element to be formed near and along its upper outer edge extending along part of the upper face with at least one ridge, near and along the other upper outer edge with at least one full-length groove, near and along an inner upper edge of the arm with at least one groove extending a full length of the upper face and provided with at least one retaining tooth, and near and along the other inner upper edge with a row of teeth, and that on the lower face of the height-compensating element aligned with the ridge there is a groove, aligned with the groove is a ridge, aligned with the groove there is a row of teeth, and aligned with the row of teeth there is a groove of the same length and orientation so that the height-compensating elements can be stacked, driven in, and set atop one another.

The alternate arrangement of ridge and groove on the upper and lower face of the height-compensating element according to the invention ensures on the one side that when driving in or setting any lateral breaking or sliding is impeded and on the other hand these formations permit a stacking of the height-compensating elements according to the invention with different thicknesses without loosening the nailing of the sheathing boards on the beams. The two ridges formed on the wedge face of the arm facilitate a sure lateral guiding during initial driving in and subsequent setting.

According to a further preferred feature of the height-compensating element according to the invention an opening angle α of 3° to 10°, preferably 5°, has been shown ideal. This bevel, which preferably is funnel-shaped, allows the problem-free centering on the nail connecting the sheathing with the beam during driving in of the height-compensating element according to the invention into the space to be filled, for example between sheathing and beam.

In a further feature of the height-compensating element according to the invention the width of the grooves is somewhat wider than that of the ridges. Since the ridge does not extend over the entire length of the flat plate while on the other hand the groove extends the full length of the lower face of the compensating element, with subsequent driving of a further height-compensating element over a height-compensating element already in the space a sure guiding without slipping is ensured. One must merely be careful to fit the ridge to the groove.

In order to compensate for different heights the thickness of the flat plate can be indexed freely. For a fine indexing, for example for dry construction, the difference in size from height-compensating element to height-compensating element is advantageously at least 1.5 mm. The indexing for the somewhat coarser field of roof work relies on a dimensional change according to a further preferred embodiment of the invention of at least 3.0 mm. Naturally of course another thickness indexing can be selected when, for example, this is necessary in metal construction.

With these indexings it is possible to combine without problems height-compensating elements of different heights according to the needs of wood, metal, or masonry construction and the like, for instance with roofs, dry construction, or facade work, doing footing or foundation work in rehab or new construction.

In order to simplify this combination the height-compensating elements of the same thickness are the same basic color, for instance white for 3.00 mm, yellow for 4.5 mm, green for 7.5 mm, and dark green for 13.5 mm.

In a preferred embodiment the height-compensating elements are made of a plastic of high strength, preferably of polyethylene, polypropylene, or polyamide or of metal, preferably aluminum, or of hard wood.

In order to prevent a lateral spreading of the arms during driving in, the flat plate and/or in its wedge-shaped end are formed with stability-increasing webs and recesses.

Naturally it is possible in the invention when the flat plate has more than two arms. These can be needed when nails are very closely spaced. From this the advantage of high flexibility and variability of the height-compensating element according to the invention is seen in facade work, roof work, and dry construction.

BRIEF DESCRIPTION OF THE DRAWINGS

Further advantages and particular features are seen in the following description of a preferred embodiment with reference to the attached drawing.

Therein.

SPECIFIC DESCRIPTION

Figure 1:
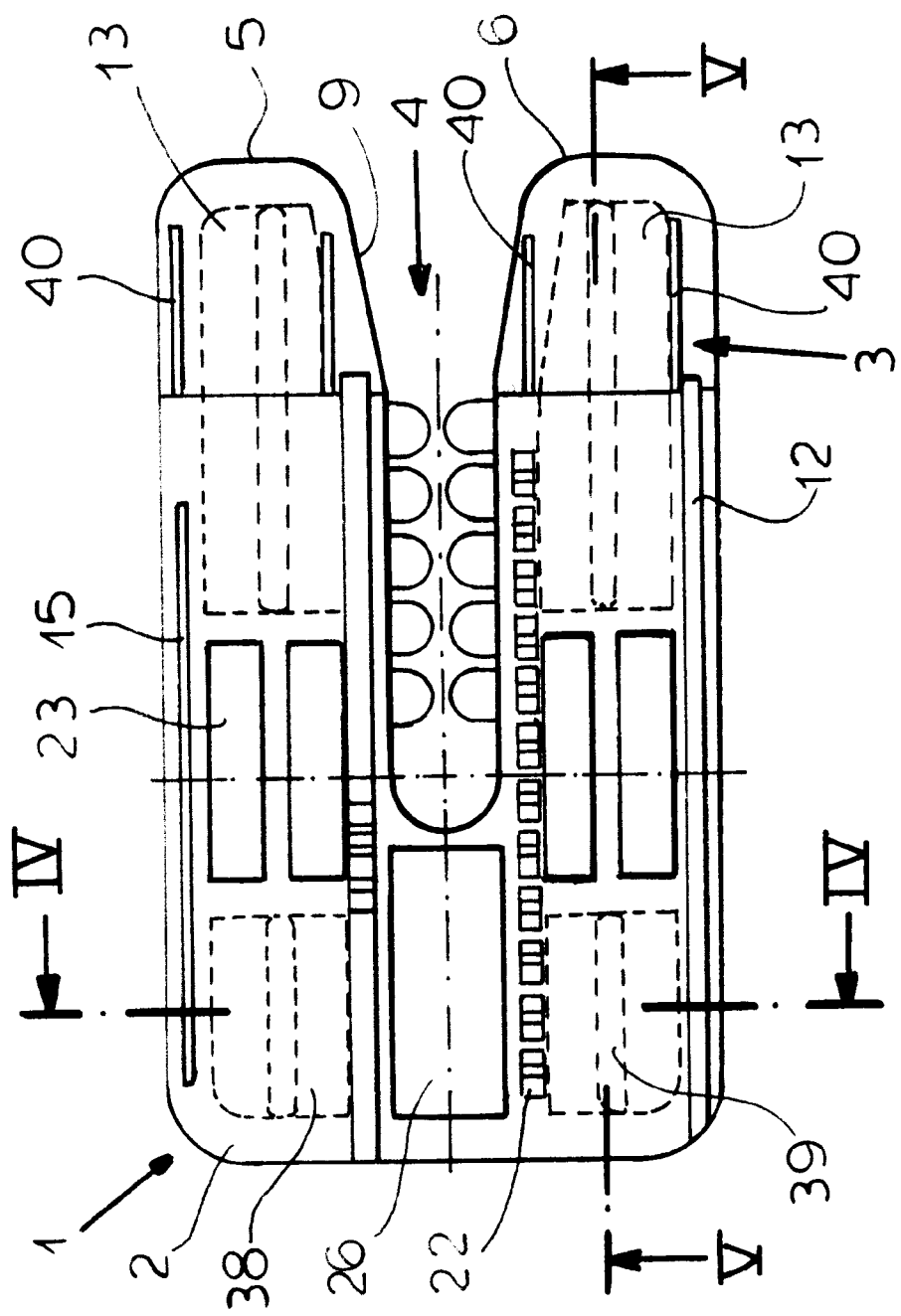
FIG. 1 is a top view of a height-compensating element according to the invention.

The height-compensating element 1 according to the invention shown in FIG. 1 is formed of a plate 1 with parallel planar faces and a unitary end 3. An insert slot 4 extends into the plate 2 at the plate 2 and subdivides the end 3 into two arms 5 and 6.

Figure 2:
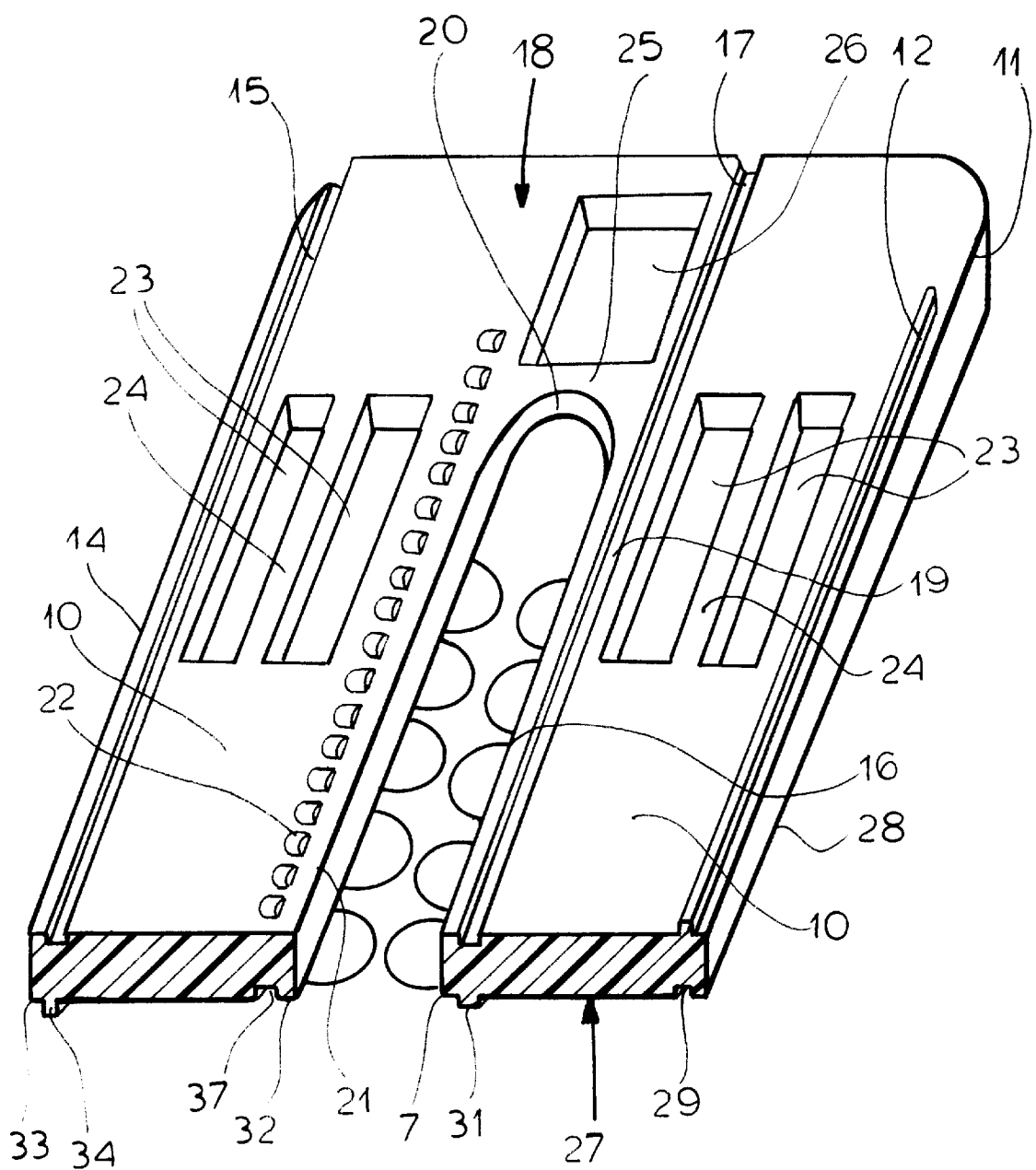
FIG. 2 is a perspective view of the flat plate of the height-compensating element according to the invention with a sectioned end.
Figure 3:
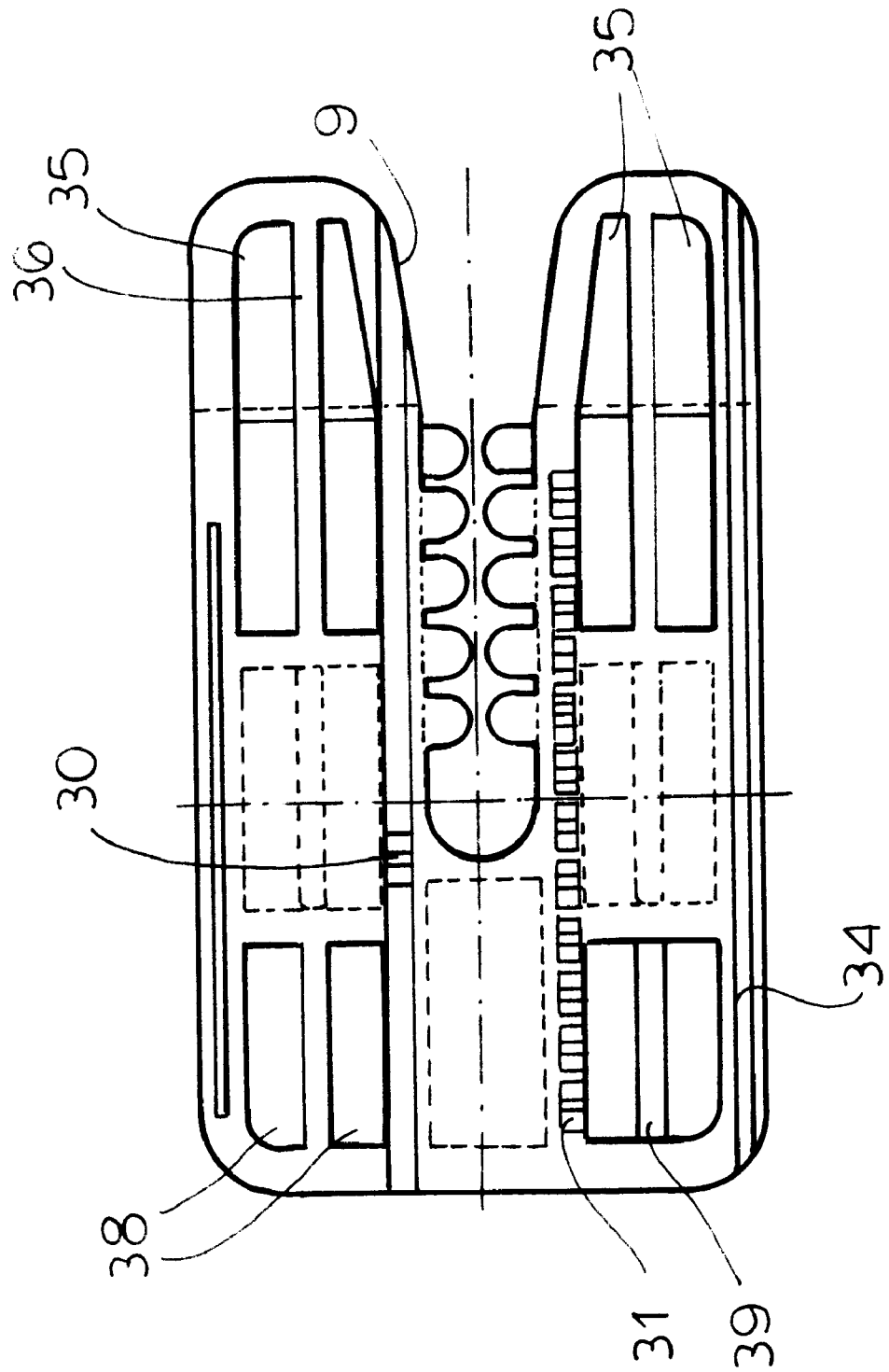
FIG. 3 is a bottom view of the height-compensating element according to the invention with reinforcement ribs.

A lower inner edge 7 of the arm 5 and a corresponding edge of the arm 6 are formed with elastic retaining tabs 8 that project toward one another at right angles into the insert slot 4. These holding tabs 8 lock solidly around nails when driven in between a beam and a structural member so that falling out is avoided. The two arms 5 and 6 of the end 3 are shaped as wedges and have an angled bevel 9 that is inclined in the longitudinal direction of the slot and that ensures an exact grabbing of the nail by the insert slot 4. The opening angle α is 3°. A top face 10 of the height-compensating element 1 is formed as shown in FIG. 2 near and along its outer edge 11 with a ridge 12 that extends up to a wedge face 13 of the end 3 while still extending only over a portion of the entire upper face 10 of the flat plate 2. This ensures that when driven in the ridge 12 is not deformed and continues to act as a guide. Near and along another other upper outer edge 14 of the height-compensating element 1 is an upper guide groove 15 formed in the upper face 10 and having a width B that is somewhat greater than the width of the ridge 12. The guide ridge 15 also reaches into the wedge face 13 of the end 3.

Near and along an upper inner edge 16 of the arm 5 is an upper guide groove 17 which is formed in the upper face 10 of the height-compensating element 1 extending continuously to an end region 18. This guide groove 17 holds a single retaining tooth 19 generally level with a slot base 20 and projecting up from the groove floor. Directly at an upper inner edge 21 of the other arm 6 is on the upper face 10 of the height-compensating element 1 a row of retaining teeth 22 which itself extends in one direction up to the wedge face 13 of the end 3 and in the opposite direction only partially along the upper face 10. Starting from the outer edge 11 on the upper face 10 of the height-compensating element 1 the following elements succeed each other: ridge 12, groove 17, tooth row 22, groove 15.

Each arm 5 and 6 is formed with an upper recess 23 which is reinforced by a longitudinally extending web 24. The slot base 20 is separated by a web 25 from a recess 26 which is formed in the end region 18 and which is generally as wide as the slot 4.

A lower face 27 of the height-compensating element 1 according to the invention is formed along a lower edge 28 opposite the outer edge 11 with a longitudinal groove 29 extending the full length of the lower face 27 (see FIG. 2). Near and along the lower inner edge 7 of the arm 5 on the lower face 27 is a row of teeth 31 31 of the same size and shape as the row of teeth 22 on the upper face 10. Thus the row of teeth 31 on the lower face 27 and the groove 17 on the upper face are directly aligned with each other as is the ridge 12 on the upper face 10 and the groove 29 on the lower face 27.

Near and along another lower inner edge 32 of the arm 6 on the lower face 27 is a groove 37 which is aligned with the row of teeth 22 on the upper face 10. This groove 37 has like the groove 17 a tooth 30. Near and along a lower outer edge 33 of the height-compensating element 1 is on the lower face 27 a further ridge 34 which is aligned with the groove 25 on the upper face 10.

Figure 4:
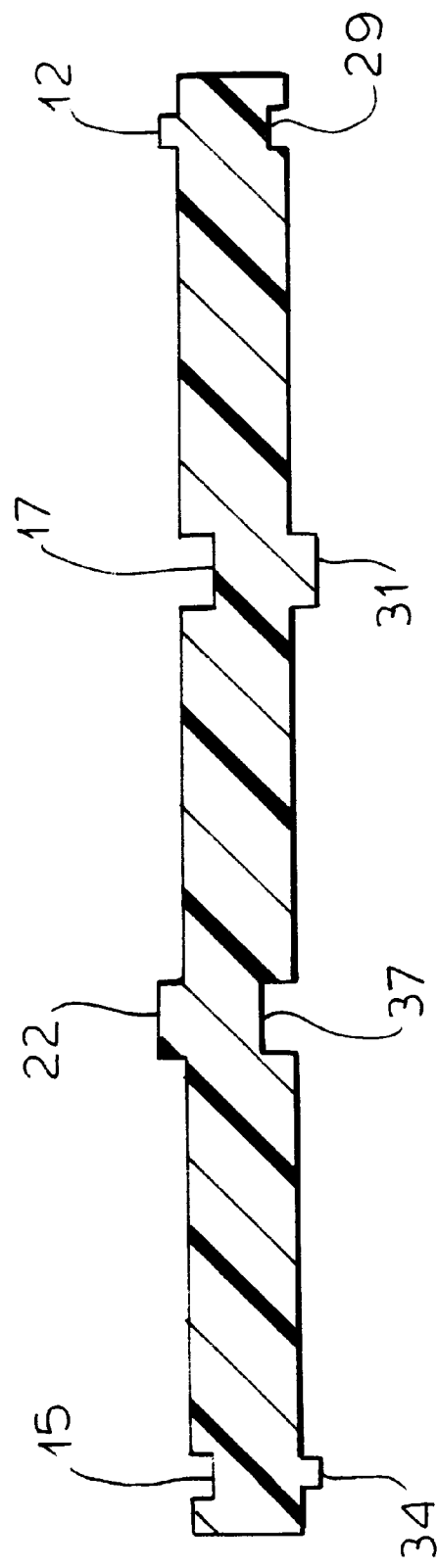
FIG. 4 is a view of the rib, guide groove, and row of retaining teeth taken on line IV—IV of FIG. 1.

FIG. 4 shows a section along line IV—IV of FIG. 1 from which the position of the formations on the upper face 10 and on the lower face 27 can be seen. The ridge 12 on the upper face 10 is aligned with the groove 29, the groove 17 on the upper face 10 is aligned with the row of teeth 31 on the lower face 27, the row of teeth 22 is aligned with the groove 37, and the groove 15 is aligned with the ridge 34 on the lower face 27.

These formations ensure a nonslip stacking of the height-compensating elements 1 according to the invention in a gap between roof sheathing and a beam so that height-compensating elements 1 with different thicknesses H can be combined. In this manner it is no problem for the roofing contractor to get the necessary height spacing for specific field conditions. The combination of the height-compensating elements 1 according to the invention is facilitated by appropriately coloring different sizes.

During driving in the ridges 12 and 34 prevent the height-compensating element 1 from slipping in the gap to be filled and the rows of teeth ensure a setting of the height-compensating element. This effect is reinforced by ridges 40 of different length on the wedge face 13 which also extend at the outer and inner edge of the two arms 5 and 6 in the driving-in direction. During driving in at first the ridges 40 engage and bite into the surrounding wood, for instance the sheathing, so that the arms 5 and 6 are also laterally guided before the ridges 12 and 34 of the flat plate 2 come into action.

Figure 5:
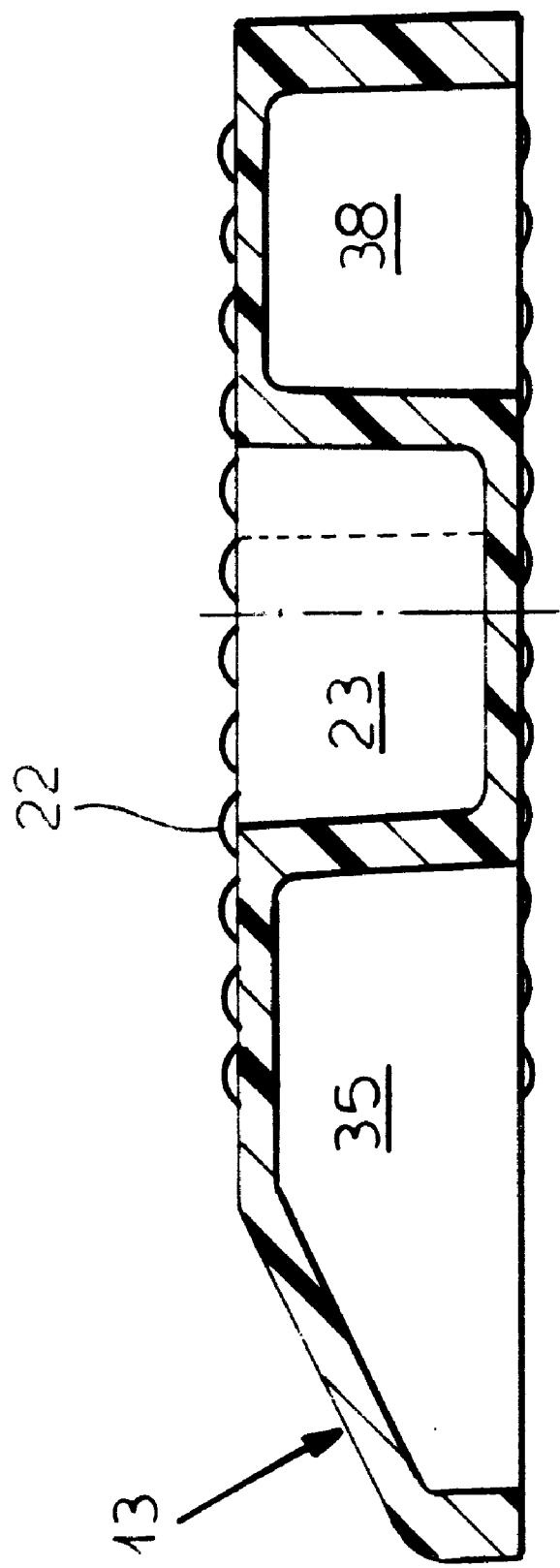
FIG. 5 is a side-sectional view taken on line V—V of FIG. 1.

On the lower face 27 the two arms 5 and 6 are formed with elongated recesses 35 which are reinforced by webs 36 arranged in the recesses. The webs 36 extend in the insertion direction, that is longitudinally of the two arms (FIG. 5). They prevent deformation and spreading of the two arms during driving in and setting as do the two lower recesses 38 with their webs 39 in the end region 18 on the lower face 27 of the flat plate 2.

List of used reference numerals

| | |
|---|---|
| Height-compensating element | 1 |
| Flat plate | 2 |
| Wedge-shaped end | 3 |
| Insert slot | 4 |
| Arms | 5, 6 |
| Lower inner edge of arm 5 | 7 |
| Elastic retaining tabs | 8 |
| Bevel | 9 |
| Top face of height-compensating element | 10 |
| Upper outer edge of height-compensating element | 11 |
| Ridge | 12 |
| Wedge face of end | 13 |
| Upper outer edge of height-compensating element | 14 |
| Upper groove in the upper face (arm 6) | 15 |
| Upper inner edge of arm 5 | 16 |
| Upper groove in the upper face (arm 6) | 17 |
| End region of the height-compensating element | 18 |
| Tooth in the groove 17 | 19 |
| Slot base | 20 |
| Upper inner edge of the arm 6 | 21 |
| Row of retaining teeth on the upper face 10 | 22 |
| Upper recess in the arms 5 and 6 | 23 |
| Webs in the recess | 24 |
| Web in the recess | 25 |
| Recess in the end region 18 | 26 |
| Lower face of the height-compensating element | 27 |
| Lower outer edge of the height-compensating element | 28 |
| Groove in the lower face (arm 5) | 29 |
| Tooth in the groove 37 | 30 |
| Row of teeth on the lower face (arm 5) | 31 |
| Lower inner edge of the arm 6 | 32 |
| Lower outer edge outer edge of the height-compensating element | 33 |
| Lower ridge on the lower face (arm 6) | 34 |
| Lower recesses in the arms 5 and 6 | 35 |
| Webs | 36 |
| Groove in the lower face 27 (arm 6) | 37 |
| Lower recess | 38 |

-continued

List of used reference numerals

| | |
|---|---|
| Webs in the lower recess | 39 |
| Ridges | 40 |
| Width of slot | B |
| Thickness | H |

What is claimed is:

1. A shim comprising a one-piece plate having opposite parallel upper and lower faces and formed with
   a wedge-shaped end having angled surfaces,
   a longitudinal slot subdividing the plate at the end into a pair of longitudinally extending arms,
   rows of transverse elastic retaining tabs projecting toward each other in the slot from inner edges of the arms,
   an outwardly open bevel on each arm inner edge at an outer end of each arm,
   longitudinal guide ridges on the angled web surfaces,
   interfitting and complementary longitudinally extending guide formations on the upper and lower faces constructed such that the guide formations of an upper face of one such shim can fit with and slide in the guide formations of a lower face of another such shim,
   outwardly open recesses in the upper and lower faces, and
   longitudinally extending webs in each of the recesses.

2. The shim defined in claim 1 wherein the guide formations include a longitudinally extending ridge on one of the faces and a groove on the other face directly opposite the ridge.

3. The shim defined in claim 2 wherein the groove is slightly wider than the ridge.

4. The shim defined in claim 1 wherein the guide formations include a longitudinally extending row of teeth on one of the faces and a longitudinally extending groove on the other of the faces formed with at least one tooth, the groove being wider than the row of teeth.

5. The shim defined in claim 1 wherein the guide formations include a longitudinally extending ridge and a longitudinally extending ridge on each of the faces, a longitudinally extending row of teeth on each of the faces, and a longitudinally extending groove on each the faces formed with at least one tooth.

6. The shim defined in claim 1 wherein there are two such guide ridges of different length on each surface.

7. The shim defined in claim 1 wherein each bevel extends at an angle of 3° to 10° to the slot.

8. The shim defined in claim 7 wherein each bevel extends at an angle of 5° to the slot.

9. The shim defined in claim 1 wherein the plate is 1.5 mm thick, whereby the shim is suitable for dry construction.

10. The shim defined in claim 1 wherein the plate is 3.0 mm thick, whereby the shim is suitable for roof construction.

11. The shim defined in claim 1 wherein the plate is of plastic.

12. The shim defined in claim 11 wherein the plate is of polyethylene, polypropylene, or polyamide.

13. The shim defined in claim 1 wherein the plate is of metal.

14. The shim defined in claim 1 wherein the plate is of hard wood.

15. The shim defined in claim 1 wherein the plate is generally rectangular.

16. A shim comprising a one-piece plate having opposite parallel upper and lower faces and formed with a wedge-shaped end having angled surfaces, a longitudinal slot subdividing the plate at the end into a pair of longitudinally extending arms, rows of transverse elastic retaining tabs projecting toward each other in the slot from inner edges of the arms, an outwardly open bevel on each arm inner edge at an outer end of each arm, longitudinal guide ridges on the angled web surfaces, interfitting and complementary longitudinally extending guide formations on the upper and lower faces constructed such that the guide formations of an upper face of one such shim can fit with and slide in the guide formations of a lower face of another such shim, outwardly open recesses in the upper and lower faces, and longitudinally extending webs in each of the recesses.

\* \* \* \* \*